W. A. REICH.
Churn.

No. 212,263.     Patented Feb. 11, 1879.

WITNESSES:
Achilles Schehl.
C. Sedgwick

INVENTOR:
W. A. Reich
BY Munn & Co
ATTORNEYS.

UNITED STATES PATENT OFFICE.

WILLIAM A. REICH, OF SALEM, NORTH CAROLINA.

IMPROVEMENT IN CHURNS.

Specification forming part of Letters Patent No. 212,263, dated February 11, 1879; application filed October 10, 1878.

*To all whom it may concern:*

Be it known that I, WILLIAM A. REICH, of Salem, Forsyth county, North Carolina, have invented an Improved Churn and Egg-Beater, of which the following is a specification:

The object of this invention is to force the cream or egg back and forth through a foraminous plate while exposed to a column of compressed air.

Figure 1:
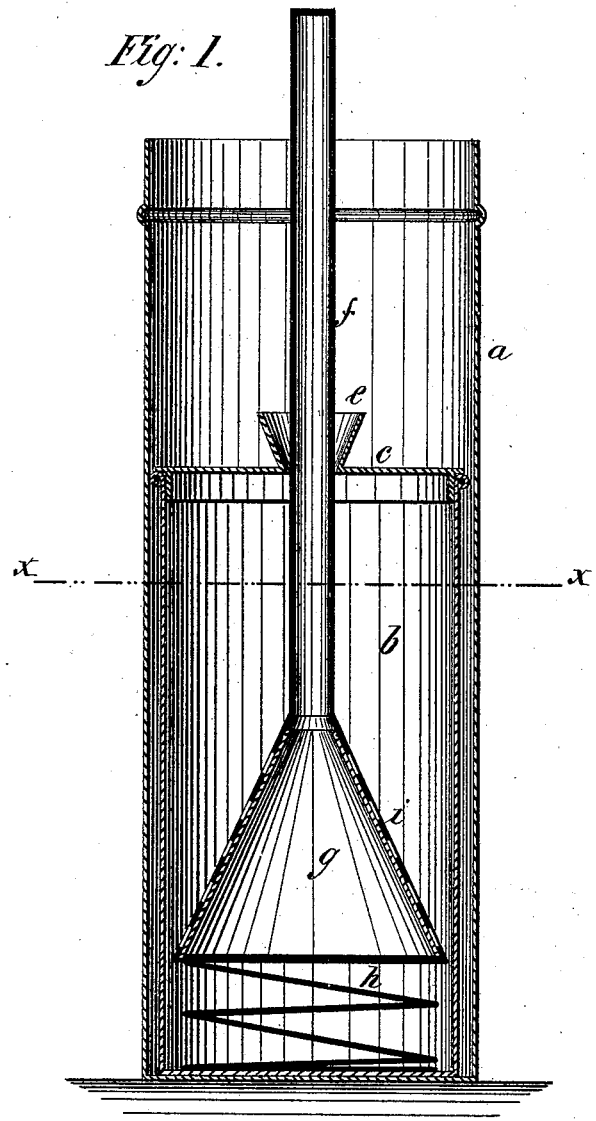
Figure 2:
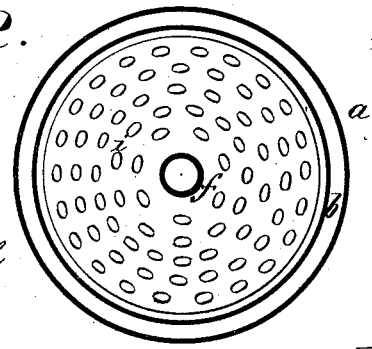

Figure 1 of the drawings is a sectional elevation, and Fig. 2 a horizontal section on line $x\ x$ of Fig. 1.

$a$ represents the casing, in which I preferably keep the churn or egg-beater. $b$ is the vessel or receptacle for the liquid, and $c$ is the cover, which is provided with an upwardly-flaring flange that surrounds the hole through which the handle passes. $g$ is a hollow conical dasher, open at the top and bottom, and supported on a subjacent spring, $h$. $i$ is a vertically-reciprocating hollow conical plunger, that fits over the dasher and forces it to the bottom of the vessel. This plunger is reticulated on the side, and provided with a hollow handle, $f$, the latter being closed at top and open at the bottom.

The operation is as follows: The descent of the plunger forces the egg or cream through its numerous perforations and breaks, as well as agitates, the fluid while the suction produced by the imperforate dasher in its ascent with the plunger upon its upstroke very materially assists in again drawing the cream or egg through the perforations of the plunger.

What I claim as new and of my invention is—

The combination, as herein shown and described, with the receptacle $b$, of the hollow cone $g$, open at top and bottom, resting on the spring $h$, the hollow perforated plunger $i$, and handle $f$, for the purpose specified.

WILLIAM AUGUSTUS REICH.

Witnesses:
 E. A. EBERT,
 L. B. WALLER.